(12) United States Patent
Liu

(10) Patent No.: US 10,402,668 B2
(45) Date of Patent: Sep. 3, 2019

(54) INTERACTIVE METHOD, INTERACTIVE APPARATUS, AND USER EQUIPMENT

(71) Applicant: BEIJING ZHIGU RUI TUO TECH CO., LTD., Beijing (CN)

(72) Inventor: Jia Liu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 79 days.

(21) Appl. No.: 15/541,413

(22) PCT Filed: Jan. 7, 2016

(86) PCT No.: PCT/CN2016/070351
§ 371 (c)(1),
(2) Date: Jul. 3, 2017

(87) PCT Pub. No.: WO2016/112821
PCT Pub. Date: Jul. 21, 2016

(65) Prior Publication Data
US 2017/0364762 A1 Dec. 21, 2017

(30) Foreign Application Priority Data

Jan. 12, 2015 (CN) .......................... 2015 1 0014626

(51) Int. Cl.
*G06K 9/00* (2006.01)
*G06F 21/32* (2013.01)

(52) U.S. Cl.
CPC ......... *G06K 9/00892* (2013.01); *G06F 21/32* (2013.01); *G06K 9/0061* (2013.01); *G06K 9/00067* (2013.01)

(58) Field of Classification Search
CPC .. G06K 9/00; G06K 9/00221; G06K 9/00979; G06K 9/00228; G06K 9/00362;
(Continued)

(56) References Cited

U.S. PATENT DOCUMENTS 8,023,700 B2 9/2011 Riionheimo
8,245,305 B2 * 8/2012 Mochizuki ............ G06F 21/604
707/609
(Continued)

FOREIGN PATENT DOCUMENTS

CN 101689096 A 3/2010
CN 102135830 A 7/2011
(Continued)

OTHER PUBLICATIONS

International Search Report and Written Opinion for Application No. PCT/CN2016/070351, dated Apr. 11, 2016, 9 pages.

*Primary Examiner* — Duy M Dang
(74) *Attorney, Agent, or Firm* — Sheppard Mullin Richter & Hampton LLP

(57) ABSTRACT

Embodiments of the present invention disclose interactive methods, interactive apparatus, and user equipment. An interactive method disclosed herein comprises: acquiring a piece of user input information, wherein the piece of user input information comprises at least two pieces of biometric feature information and at least one piece of input action information corresponding to the at least two pieces of biometric feature information; determining at least two pieces of content respectively corresponding to the at least two pieces of biometric feature information; determining inter-content operation information corresponding to the at least one piece of input action information; and performing an interactive operation corresponding to the inter-content operation information, wherein the interactive operation is associated with the at least two pieces of content. In the embodiments of the present application, at least two pieces of content that are to be operated on are determined by using at least two pieces of biometric feature information of a user, and an interaction between the at least two pieces of content is determined by using input action information correspond-
(Continued)

ing to the at least two pieces of biometric feature information, which can be implemented quickly and easily, and thereby improving user experience.

14 Claims, 4 Drawing Sheets

(58) Field of Classification Search
CPC ........... G06K 9/00369; G06K 9/00993; G06K 9/3241; G06T 7/00
See application file for complete search history.

(56) References Cited

U.S. PATENT DOCUMENTS

| | | | | |
|---|---|---|---|---|
| 8,588,478 | B2* | 11/2013 | Makimoto | G06K 9/00013 382/116 |
| 2005/0229008 | A1 | 10/2005 | Crane | |
| 2007/0050398 | A1* | 3/2007 | Mochizuki | G06F 21/604 |
| 2009/0028395 | A1 | 1/2009 | Riionheimo | |
| 2009/0226052 | A1* | 9/2009 | Fedele | G06K 9/00046 382/125 |
| 2013/0257777 | A1 | 10/2013 | Benko et al. | |
| 2013/0295572 | A1* | 11/2013 | Liu | G01N 1/30 435/6.12 |
| 2014/0012512 | A1* | 1/2014 | Yuen | G06F 19/3418 702/19 |
| 2014/0184549 | A1 | 7/2014 | Cheng et al. | |
| 2014/0230010 | A1* | 8/2014 | Ginter | G06F 21/10 726/1 |

FOREIGN PATENT DOCUMENTS

| | | |
|---|---|---|
| CN | 103135761 A | 6/2013 |
| CN | 103246836 A | 8/2013 |
| CN | 103309447 A | 9/2013 |
| CN | 103365450 A | 10/2013 |
| CN | 103995998 A | 8/2014 |
| CN | 104573459 A | 3/2015 |
| WO | 2009/013253 A1 | 1/2009 |

* cited by examiner

INTERACTIVE METHOD, INTERACTIVE APPARATUS, AND USER EQUIPMENT

CROSS-REFERENCE TO RELATED APPLICATIONS

The present application is a National Phase Application of International Application No. PCT/CN2016/070351, filed on Jan. 7, 2016, which claims the priority to and benefit of Chinese Patent Application No. 201510014626.2, filed on Jan. 12, 2015, and entitled "Interactive Method, Interactive Apparatus and User Equipment". Both of the above-referenced applications are incorporated in the present application by reference herein in their entirety.

RELATED APPLICATION

The present international patent cooperative treaty (PCT) application claims the priority to and benefit of Chinese Patent Application No. 201510014626.2, filed on Jan. 12, 2015, and entitled "Interactive Method, Interactive Apparatus and User Equipment", which is hereby incorporated into the present international PCT application by reference herein in its entirety.

TECHNICAL FIELD

The present application generally relates to the field of interactive technologies, and in particular, to interactive methods, interactive apparatus, and user equipment.

BACKGROUND

With the development of technologies, various kinds of biosensor products such as fingerprint sensors emerge continuously. Many human based biometric feature applications, especially fingerprint information-based applications, have been applied in consumer electronics such as computers, mobile phones, and the like and gradually gain popularity. Besides specialized biometric recognition sensors, the touchscreen fingerprint recognition technology can further acquire a fingerprint image through a screen directly, and thereby enriching means of acquiring biometric feature information.

SUMMARY

One objective of embodiments of the present application is to provide an interactive technology solution.

According to a first aspect, a possible implementation solution of the present application provides an interactive method, comprising:

acquiring a piece of user input information, wherein the piece of user input information comprises at least two pieces of biometric feature information and at least one piece of input action information corresponding to the at least two pieces of biometric feature information;

determining at least two pieces of content respectively corresponding to the at least two pieces of biometric feature information;

determining inter-content operation information corresponding to the at least one piece of input action information; and performing an interactive operation corresponding to the inter-content operation information, wherein the interactive operation is associated with the at least two pieces of content.

According to a second aspect, a possible implementation solution of the present application provides an interactive apparatus, comprising:

an input information acquiring module, configured to acquire a piece of user input information, wherein the piece of user input information comprises at least two pieces of biometric feature information and at least one piece of input action information corresponding to the at least two pieces of biometric feature information;

a content determining module, configured to determine at least two pieces of content respectively corresponding to the at least two pieces of biometric feature information;

an operation determining module, configured to determine inter-content operation information corresponding to the at least one piece of input action information; and a performing module, configured to perform an interactive operation corresponding to the inter-content operation information, wherein the interactive operation is associated with the at least two pieces of content.

According to a third aspect, a possible implementation solution of the present application provides a user equipment, wherein the user equipment comprising:

a memory, configured to store a program;

a processor, configured to execute the program which cause the processor to perform operations, comprising:

acquiring a piece of user input information, wherein the piece of user input information comprises at least two pieces of biometric feature information and at least one piece of input action information corresponding to the at least two pieces of biometric feature information;

determining at least two pieces of content respectively corresponding to the at least two pieces of biometric feature information;

determining inter-content operation information corresponding to the at least one piece of input action information; and performing an interactive operation corresponding to the inter-content operation information, wherein the interactive operation is associated with the at least two pieces of content.

In at least one implementation solution of the embodiments of the present application, at least two pieces of content that are to be operated on are determined by using at least two pieces of biometric feature information of a user, and an interaction between the at least two pieces of content is determined by using input action information corresponding to the at least two pieces of biometric feature information, which can be implemented quickly and easily, and thereby improving user experience.

DETAILED DESCRIPTION

Figure 1:
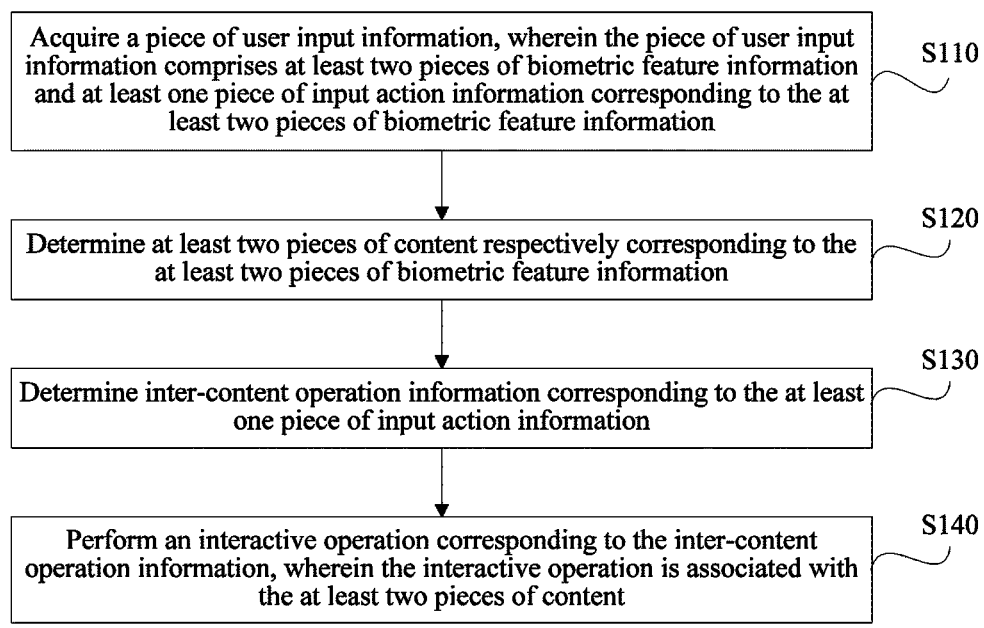
FIG. 1 is a schematic flowchart of an interactive method according to an embodiment of the present application.

Specific implementation manners of the present application are further described in detail below with reference to the accompanying drawings (in which same elements are denoted by same reference numerals wherever possible) and embodiments. The following embodiments are intended to describe the present application, but not to limit the scope of the present application.

A person skilled in the art may understand that the terms in the present application such as "first", "second", and the like are only used to differentiate different steps, devices, or modules, and the like, and represent neither any specific technical meaning nor a certain logic sequence between them.

As shown in FIG. 1, an embodiment of the present application provides an interactive method, comprising:

S110: acquiring a piece of user input information, wherein the piece of user input information comprises at least two pieces of biometric feature information and at least one piece of input action information corresponding to the at least two pieces of biometric feature information;

S120: determining at least two pieces of content respectively corresponding to the at least two pieces of biometric feature information;

S130: determining inter-content operation information corresponding to the at least one piece of input action information; and S140: performing an interactive operation corresponding to the inter-content operation information, wherein the interactive operation is associated with the at least two pieces of content.

For example, as an entity that executes this embodiment, an interactive apparatus provided in the present application executes S110 to S140. Specifically, the interactive apparatus may be disposed in a user equipment by means of software, hardware, or a combination of software and hardware, or the interactive apparatus itself is the user equipment; and the user equipment comprises, but is not limited to, a smart phone, a tablet computer, a notebook computer, a smart wristband, a pair of smart glasses, a smart helmet and the like.

In one implementation manner of the embodiment of the present application, at least two pieces of content that are to be operated on are determined by using at least two pieces of biometric feature information of a user, and an interaction between the at least two pieces of content is determined by using input action information corresponding to the at least two pieces of biometric feature information, which is implemented quickly and easily, and thereby improving user experience.

Steps of an embodiment of the present application are further described by using the following implementation manners:

S110: Acquire a piece of user input information.

In a possible implementation manner, the piece of user input information comprises at least two pieces of biometric feature information and at least one piece of input action information corresponding to the at least two pieces of biometric feature information.

In a possible implementation manner, each piece of biometric feature information of the at least two pieces of biometric feature information comprises at least one of the following:

a fingerprint, a palmprint, a toe-print, a sole print, iris information, retina information, human face information, and auricle information.

For example, in a possible implementation manner, using an example in which the piece of user input information comprises two pieces of biometric feature information, and the two pieces of biometric feature information may be two fingerprints corresponding to two fingers of a user; or in another possible implementation manner, the two pieces of biometric feature information may be palmprints of two palms of the user, and the like. In some possible implementation manners, types of the two pieces of biometric feature information may be different, for example, a piece of biometric feature information is a fingerprint of a finger of a hand of the user, and another piece of biometric feature information is a palmprint of another hand of the user; or for example, a piece of biometric feature information is a fingerprint of a finger of the user, and another piece of biometric feature information is an iris of an eye of the user, and the like.

Certainly, a person skilled in the art may know that, besides the types of the biometric feature information described above, other possible biometric feature information, especially biometric feature information corresponding to a biometric feature of the user that may move freely, may also be applied in the embodiment of the present application.

In a possible implementation manner, the at least one piece of input action information corresponding to the at least two pieces of biometric feature information may comprise at least one of the following:

moving track information, movement time information, relative motion information, and relative location information that correspond to the at least two pieces of biometric feature information.

In a possible implementation manner, the moving track information can be moving track information of parts of the body of a user that correspond to the at least two pieces of biometric feature information in a movement. For example, when a piece of biometric feature information is a fingerprint, the moving track information comprises a moving track information corresponding to touching a touchscreen and leaving the touchscreen by a finger with the fingerprint.

Alternatively, in a possible implementation manner, the moving track information can be moving track information of the parts of the body of the user that correspond to the at least two pieces of biometric feature information in a preset time duration. For example, moving track information corresponding to touching a touchscreen by fingers of the user in the preset time duration. In a possible implementation manner, the number of times that the touchscreen being touched, for example, tapping, double-tapping, and the like, within the preset time may be included in the moving track information.

In this implementation manner, the moving track information comprises all moving track information corresponding to the at least two pieces of biometric feature information. In a possible implementation manner, motionlessness of the part of the body of the user that corresponds to one or more pieces of biometric feature information in the at least two pieces of biometric feature information is also a special state of a movement.

In a possible implementation manner, the movement time information can be, for example, time required to perform a pre-set action by the parts of the body that correspond to the at least two pieces of biometric feature information. Using the example in which the at least two pieces of biometric feature information is at least two fingerprints, in a possible implementation manner, the movement time information may comprise, for example, time duration that the fingers of the user stay at a location (the time duration may be used to determine whether the action of the user is long press or short press).

In a possible implementation manner, the relative motion information can be that, for example, the parts of the body that correspond to the at least two pieces of biometric feature information move closer to each other or away from each other. For example, two fingers corresponding to the two fingerprints of the user move closer to each other or away from each other.

In a possible implementation manner, the relative location information can be, for example, distance information and relative orientation information between the parts of the body that correspond to the at least two pieces of biometric feature information. For example, it may be a distance between the two fingers corresponding to two fingerprints of the user, and a position relationship (such as upper-lower, left-right) between the two fingers, and the like.

It may be seen from the foregoing description that, the at least one piece of input action information is associated with the at least two pieces of biometric feature information, for example:

In a possible implementation manner, when the at least two pieces of biometric feature information comprises fingerprints or palmprints of the user, the input action information may comprise hand gesture information of the user.

In a possible implementation manner, when the at least two pieces of biometric feature information comprises iris information of the user, the input action information may comprise eye movement information of the user.

In an embodiment of the present application, the acquiring a piece of user input information may be, for example, collecting the at least two pieces of biometric feature information and the input action information by using an information sensor module.

For example, a fingerprint of the user and input action information of a finger corresponding to the fingerprint on the touchscreen may be obtained by a touchscreen that can collect fingerprints. Alternatively, the biometric feature information and the input action information may also be obtained by obtaining an image and performing analysis and processing by an image collecting module. Alternatively, in a possible implementation manner, the user input information may further be obtained by using various information sensor modules, for example, obtaining a piece of iris information of the user and eye movement information that corresponds to the iris information by using an image collecting module, and obtaining a fingerprint and hand gesture information that corresponds to the fingerprint by using a touchscreen as described above.

In another possible implementation manner, the user input information may further be obtained from other devices by means of communications.

S120: Determine at least two pieces of content respectively corresponding to the at least two pieces of biometric feature information.

In a possible implementation manner, each piece of content of the at least two pieces of content comprises at least one of the following:

a user equipment, an application program, and data.

In a possible implementation manner, types of all content of the at least two pieces of content are the same. For example, the at least two pieces of content are at least two user equipments, or at least two application programs, or at least two sets of data. Alternatively, in a possible implementation manner, the at least two pieces of content may comprise two or more types of content. For example, the at least two pieces of content comprise an application program and a set of data.

Certainly, besides the types of content described above, other content that can be interacted between content may be interacted easily and quickly by using the methods in the embodiments of the present application.

In a possible implementation manner, the at least two pieces of content corresponding to the at least two pieces of biometric feature information may be obtained by using a matching relationship between multiple pieces of biometric feature information and multiple pieces of content. For example, in a possible implementation manner, four fingerprints of four fingers of the user respectively corresponds to four user equipments, the following matching relationship table may be obtained:

TABLE 1

Matching relationship between fingerprints and user equipments

| Fingerprint | User Equipment |
| --- | --- |
| Fingerprint of the thumb | Smart watch |
| Fingerprint of the index finger | Pair of smart glasses |
| Fingerprint of the middle finger | Smart headset |
| Fingerprint of the ring finger | Smart finger ring |
| . . . | . . . |

When performing an interactive operation between a smart watch and a pair of smart glasses, the user may use a thumb and an index finger to complete a control gesture, for example, a close gesture is completed on the touch screen by moving the thumb and the index finger closer to each other. By using the methods in the embodiment of the present application, fingerprints of the thumb and the index finger may be acquired according to the step S110, and then the smart watch and the pair of smart glasses of the user are determined according to the step S120.

In a possible implementation manner, an association relationship between the biometric feature information and the content may be preset and stored in a storage module.

In another possible implementation manner, before the step S120, the method further comprises:

associating the at least two pieces of biometric feature information with the at least two pieces of content.

For example, in a possible implementation manner, on a touchscreen, icons corresponding to the smart watch and the pair of smart glasses are respectively shown, the user uses the thumb to touch the icon corresponding to the smart watch and uses the index finger to touch the icon corresponding to the pair of smart glasses respectively, and then corresponding fingerprints are collected by using fingerprint collection modules at corresponding locations, so that an association process is completed.

Certainly, in other possible implementation manners, the association may further be completed in other manners.

S130: Determine inter-content operation information corresponding to the at least one piece of input action information.

In a possible implementation manner, the inter-content operation information comprises at least one of the following:

operation information of establishing an inter-content association, operation information of disassociating an inter-content association, and operation information of inter-content data transmission.

For example, in a possible implementation manner, the inter-content operation information may comprise, for example, the operation information of establishing an inter-content association or the operation information of disassociating an inter-content association.

In a possible implementation manner, the at least two pieces of content are associated all the time, and the inter-content operation information may be, for example, the operation information of inter-content data transmission.

Here, in a possible implementation manner, the operation information of inter-content data transmission may be one piece, for example, one piece of the following operation information: operation information of data exchange, operation information of data synchronization, operation information of unidirectional data transmission, and the like. Alternatively, in a possible implementation manner, the operation information of inter-content data transmission may comprise multiple pieces, for example, multiple pieces of the operation information described above. Different pieces of input action information may correspond to different pieces of operation information of inter-content data transmission.

In a possible implementation manner, the step S130 may comprise, for example, comparing the at least one piece of input action information with at least one piece of preset input action information; and determining the inter-content operation information corresponding to the at least one piece of input action information according to a correspondence between the at least one piece of preset input action information and at least one piece of inter-content operation information.

Table 2 shows a possible correspondence between the at least one piece of preset input action information and the at least one piece of inter-content operation information. In this implementation manner, the at least two pieces of biometric feature information are fingerprints of the thumb and the index finger of the user, and the input action information is hand gesture information of the fingers corresponding to the fingerprints.

TABLE 2

Correspondence between preset input action information and inter-content operation information

| Preset input action information | Inter-content operation information |
| --- | --- |
| Multiple fingers move towards each other | Operation information of establishing an inter-content association |
| Multiple fingers move away from each other | Operation information of disassociating an inter-content association |
| Multiple fingers double-tap a touchscreen | Operation information of data synchronization |
| . . . | . . . |

In a possible implementation manner, the correspondence between the at least one piece of preset input action information and the at least one piece of inter-content operation information may be preset and stored in the storage module.

In another possible implementation manner, before the step S130, the method further comprises:

a step of acquiring the correspondence between the at least one piece of preset input action information and the at least one piece of inter-content operation information.

S140: Perform an interactive operation corresponding to the inter-content operation information, wherein the interactive operation is associated with the at least two pieces of content.

In the embodiments of the present application, after the at least two pieces of content and the inter-content operation information are determined, the interactive operation corresponding to the inter-content operation information is performed on the at least two pieces of content by step S140.

In the embodiments of the present application, corresponding to at least two different pieces of content and different pieces of inter-content operation information, the interactive operations may be different.

For example, in a possible implementation manner, the at least two pieces of content are two application programs of the execution body, and the inter-content operation information is operation information of inter-content data synchronization. In this case, an operation corresponding to performing the inter-content operation information may be, for example, performing an interactive operation of data synchronization between the two application programs.

Alternatively, in a possible implementation manner, the at least two pieces of content are an application program of the execution body and a set of data in a database, and the inter-content operation information is operation information of unidirectional data transmission between content. In this case, the step S140 may be, for example, outputting update data from the application program to the set of data.

In a possible implementation manner, corresponding to at least one external user equipment comprised in the at least two pieces of content, the interactive operation corresponding to the inter-content operation information may comprise:

sending (by means of directive sending or broadcasting) at least one piece of interactive information corresponding to the inter-content operation information to at least one of the at least one user equipment.

For example, in the implementation manner in which a close gesture is completed on a touchscreen by using the thumb and the index finger, as shown in the foregoing Table 1 and Table 2:

determining the at least two pieces of content as a smart watch and a pair of smart glasses of the user by using the step S120; and determining the inter-content operation information corresponding to the input action (a gesture that two fingers move closer to each other) information as the operation information of establishing an inter-content association by using the step S130.

In this implementation manner, the step S140 may be, for example, sending interactive information corresponding to establishing communication between the smart watch and the pair of smart glasses to at least one of the smart watch and the pair of smart glasses.

For example, in a possible implementation manner, the embodiment of the present application is executed by a third device, for example, a mobile phone, external to the at least one user equipment. In this case, in the step S140, the interactive information sent by the mobile phone to the smart watch and the pair of smart glasses may be, for example, interactive notification information comprising interactive object information. After receiving the corresponding interactive notification information, the smart watch and the pair of glasses may perform communication with a corresponding interactive object. Alternatively, in a possible implementation manner, the interactive notification information is sent to one of the smart watch and the pair of smart glasses, for example, to the smart watch. After receiving the interactive notification information, the smart watch sends a request to establish a connection to the pair of smart glasses according to the interactive object (that is, the pair of smart glasses) information in the interactive notification information.

Certainly, in a possible implementation manner, the execution body itself of the embodiment of the present application is one piece of the at least two pieces of content. In this case, the interactive information may be a communication request. For example, the execution body is the smart watch, and the step S140 is sending a communication request to the pair of smart glasses.

A person skilled in the art may know that, the association between the biometric feature information and the content, the inter-content operation information, and the correspondence between the preset input action information and the inter-content operation information may be set according to the needs and habits of a user.

For example, in another possible implementation manner, a user wears a pair of smart glasses and a smart watch, and they are respectively used to acquire wrist information and eye information of the user and are respectively associated with the thumb and the index finger of a right hand of the user. To manage smart devices worn by the user, the user takes out a mobile phone, open a wearable device management program, and on a screen, double-taps the screen by using the thumb and the index finger. The program obtains fingerprints of the thumb and the index finger and determines the gesture as "establishing a connection between devices", and then sends wireless signals to notify the pair of smart glasses and the smart watch to establish a connection with each other. If the user moves the thumb and the index finger closer to each other, the program determines the gesture as "exchanging data", and then sends wireless signals to notify the pair of smart glasses and the smart watch to exchange sensor data immediately. If the user keeps the thumb stay still and makes the index finger close to the thumb, the program determines the gesture as "transmitting data unidirectionally" and sends a wireless signal to the smart watch to transmit the sensor data to the pair of smart glasses.

A person skilled in the art may understand that, in the foregoing methods of the specific implementation manners of the present application, the value of the serial number of each step does not mean an execution sequence, and the execution sequence of each step should be determined according to the function and internal logic thereof, and should not be any limitation to the implementation of the specific implementation manners of the present application.

Figure 2:
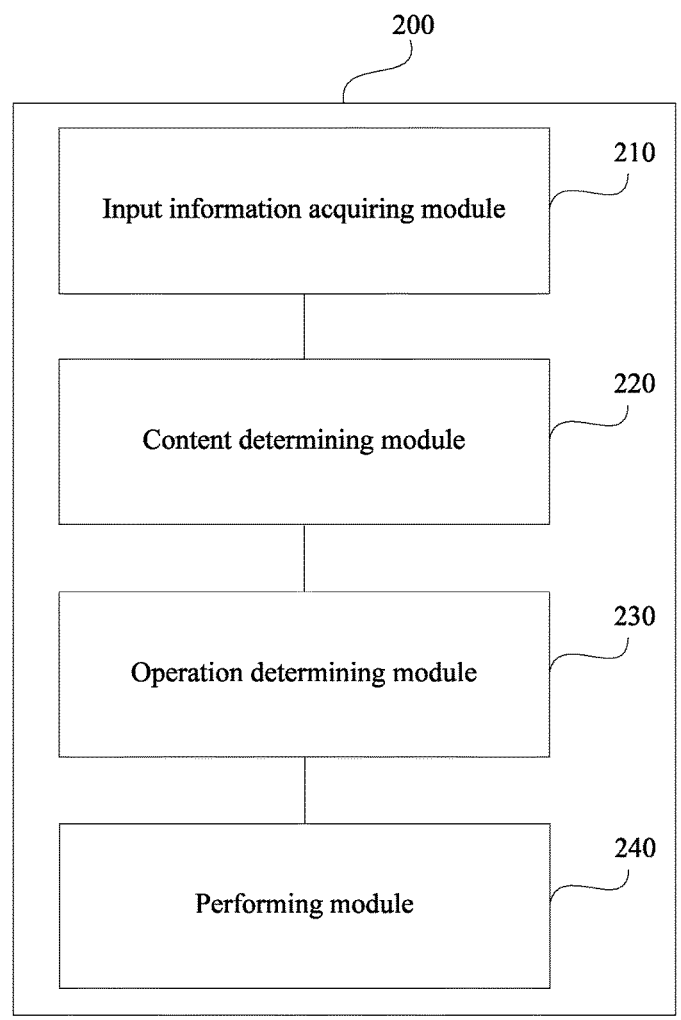
FIG. 2 is a schematic structural block diagram of an interactive apparatus according to an embodiment of the present application.

As shown in FIG. 2, an embodiment of the present application provides an interactive apparatus 200, comprising:

an input information acquiring module 210, configured to acquire a piece of user input information, wherein the piece of user input information comprises at least two pieces of biometric feature information and at least one piece of input action information corresponding to the at least two pieces of biometric feature information;

a content determining module 220, configured to determine at least two pieces of content respectively corresponding to the at least two pieces of biometric feature information;

an operation determining module 230, configured to determine inter-content operation information corresponding to the at least one piece of input action information; and a performing module 240, configured to perform an interactive operation corresponding to the inter-content operation information, wherein the interactive operation is associated with the at least two pieces of content.

In the implementation manner of one embodiment of the present application, at least two pieces of content that are to be operated on are determined by using at least two pieces of biometric feature information of a user, and an interaction between the at least two pieces of content is determined by using input action information corresponding to the at least two pieces of biometric feature information, which is implemented quickly and easily, and thereby improving user experience.

Modules and units of the embodiment of the present application are further described by using the following implementation manners.

In a possible implementation manner, each piece of biometric feature information of the at least two pieces of biometric feature information comprises at least one of the following:

a fingerprint, a palmprint, a toe-print, a sole print, iris information, retina information, human face information, and auricle information. For details, refer to the corresponding description in the embodiment as shown in FIG. 1.

In a possible implementation manner, the at least one piece of input action information corresponding to the at least two pieces of biometric feature information may comprise at least one of the following:

moving track information, movement time information, relative motion information, and relative location information that correspond to the at least two pieces of biometric feature information. For details, please refer to the corresponding description in the embodiment as shown in FIG. 1.

Certainly, a person skilled in the art may know that, besides the types of the biometric feature information described above, other possible biometric feature information, especially biometric feature information corresponding to a biometric feature of the user that can move freely, may also be applied in the embodiments of the present application.

In the embodiment of the present application, the at least one piece of input action information is associated with the at least two pieces of biometric feature information, for example:

In a possible implementation manner, when the at least two pieces of biometric feature information comprises a fingerprint or a palmprint of the user, the input action information may comprise hand gesture information of the user.

In a possible implementation manner, when the at least two pieces of biometric feature information comprises iris information of the user, the input action information may comprise eye movement information of the user.

Figure 3A:
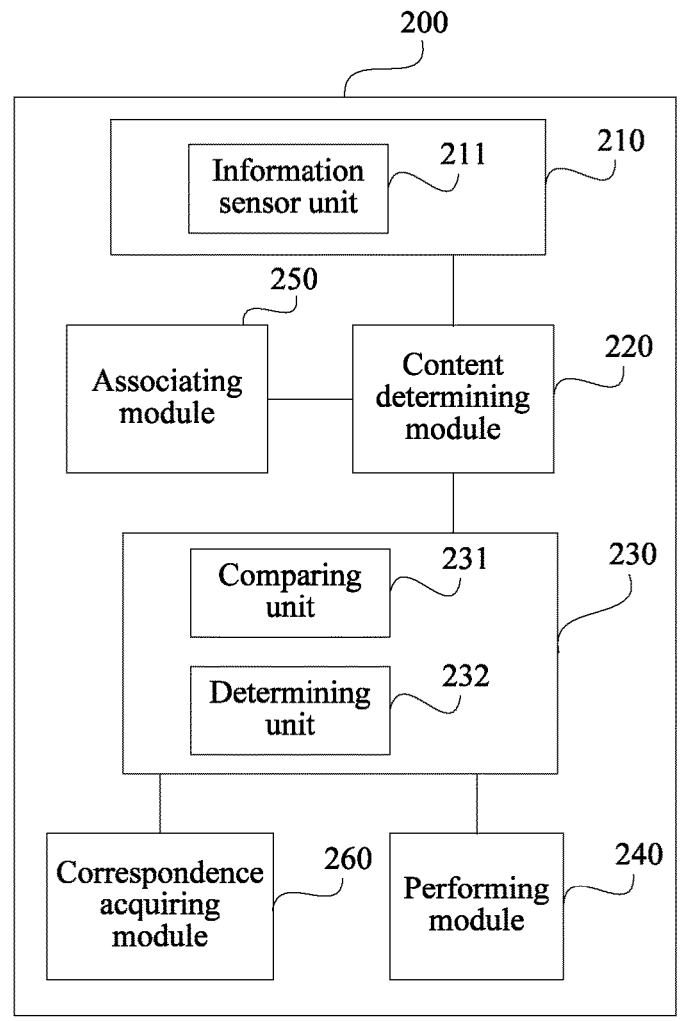
FIG. 3a is a schematic structural block diagram of an interactive apparatus according to an embodiment of the present application.

As shown in FIG. 3a, in a possible implementation manner, the input information acquiring module 210 may comprise: one or more information sensor units 211, configured to collect the at least two pieces of biometric feature information and the input action information.

In a possible implementation manner, the input information acquiring module 210 comprises, for example: a touch sensor unit that can collect fingerprints, configured to obtain a fingerprint of the user and input action information of a finger corresponding to the fingerprint on the touchscreen simultaneously. For details, please refer to the corresponding description in the embodiment as shown in FIG. 1.

Figure 3B:
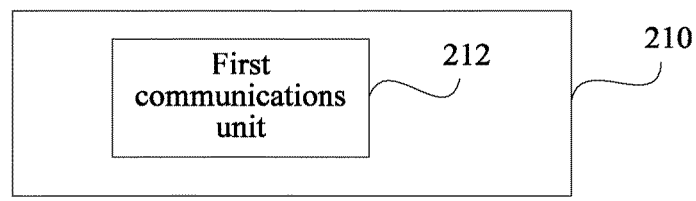
FIG. 3b is a schematic structural block diagram of an input information acquiring module of an interactive apparatus according to an embodiment of the present application.

As shown in FIG. 3b, in a possible implementation manner, the input information acquiring module 210 may comprise: a first communications unit 212, configured to acquire the user input information from other devices. For example, in a possible implementation manner, the interactive apparatus is a user equipment, for example, a smart watch, comprised in the at least two pieces of content, and the smart watch may acquire the user input information from a mobile phone by using the first communications unit 212.

In a possible implementation manner, each piece of content of the at least two pieces of content comprises at least one of the following:

a user equipment, an application program, and data.

In a possible implementation manner, types of all content of the at least two pieces of content are the same. For example, the at least two pieces of content are at least two user equipments, or at least two application programs, or at least two sets of data. Alternatively, in a possible implementation manner, the at least two pieces of content may comprise two or more types of content. For example, the at least two pieces of content comprise an application program and a set of data simultaneously.

In a possible implementation manner, the content determining module 220 may obtain the at least two pieces of content corresponding to the at least two pieces of biometric feature information by using a matching relationship between multiple pieces of biometric feature information and multiple pieces of content. For details, please refer to the corresponding description in the embodiment as shown in FIG. 1.

As shown in FIG. 3a, in a possible implementation manner, the apparatus 200 further comprises:

an associating module 250, configured to associate the at least two pieces of biometric feature information with the at least two pieces of content. For details, refer to the corresponding description in the embodiment as shown in FIG. 1.

In a possible implementation manner, the inter-content operation information comprises at least one of the following:

operation information of establishing an inter-content association, operation information of disassociating an inter-content association, and operation information of inter-content data transmission. For details, please refer to the corresponding description in the embodiment as shown in FIG. 1.

As shown in FIG. 3a, in a possible implementation manner, the operation determining module 230 comprises:

a comparing unit 231, configured to compare the at least one piece of input action information with at least one piece of preset input action information; and a determining unit 232, configure to determine the inter-content operation information corresponding to the at least one piece of input action information according to a correspondence between the at least one piece of preset input action information and at least one piece of inter-content operation information.

For function implementation of the operation determining module 230, please refer to the corresponding description in the embodiment as shown in FIG. 1.

As shown in FIG. 3a, in a possible implementation manner, the apparatus 200 further comprises:

a correspondence acquiring module 260, configured to acquire the correspondence between the at least one piece of preset input action information and the at least one piece of inter-content operation information.

The "acquiring" here may be acquiring from an external device or a local database.

Figure 3C:
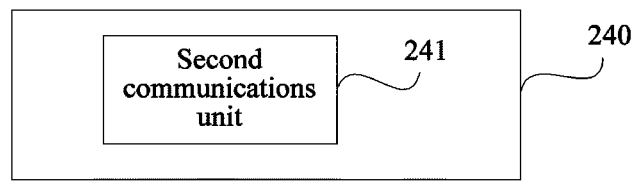
FIG. 3c is a schematic structural block diagram of a performing module of an interactive apparatus according to an embodiment of the present application.

As shown in FIG. 3c, in a possible implementation manner, the performing module 240 further comprises:

a second communications unit 241, configured to: corresponding to at least one external user equipment comprised in the at least two pieces of content, send at least one piece of interactive information corresponding to the inter-content operation information to at least one of the at least one user equipment.

In the embodiment of the present application, for further description about function implementation of the modules and the units, please refer to the corresponding description in the embodiment as shown in FIG. 1, and details are not repeated here again.

Figure 4:
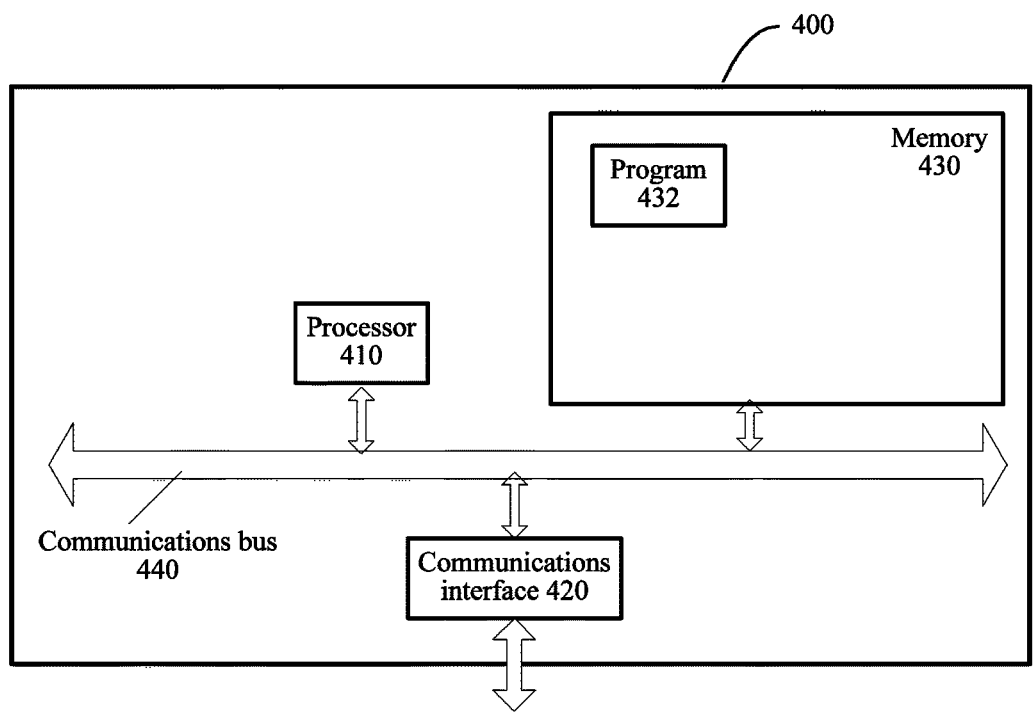
FIG. 4 is a schematic structural block diagram of an interactive apparatus according to an embodiment of the present application.

FIG. 4 is a schematic structural diagram of another interactive apparatus 400 according to an embodiment of the present application. Specific embodiments of the present application are not intended to limit specific implementation of the interactive apparatus 400. As shown in FIG. 4, the interactive apparatus 400 may comprise:

a processor 410, a communications interface 420, a memory 430, and a communications bus 440.

The processor 410, the communications interface 420, and the memory 430 communicate with each other by using the communications bus 440;

The communications interface 420 is configured to communicate with a network element such as a client.

The processor 410 is configured to execute a program 432. Specifically, the processor 410 may perform relevant steps in the foregoing method embodiments.

Specifically, the program 432 may comprise program codes, wherein the program code comprises computer operation instructions.

The processor 410 may be a central processing unit (CPU), an application specific integrated circuit (ASIC), or one or more integrated circuits configured to implement the embodiments of the present application.

The memory 430 is configured to store the program 432. The memory 430 may comprise a high-speed RAM memory, or may further comprise a non-volatile memory, for example, at least one disk memory. The program 432 may be specifically used to cause the interactive apparatus 400 to perform the following steps:

acquiring a piece of user input information, wherein the piece of user input information comprises at least two pieces of biometric feature information and at least one piece of input action information corresponding to the at least two pieces of biometric feature information;

determining at least two pieces of content respectively corresponding to the at least two pieces of biometric feature information;

determining inter-content operation information corresponding to the at least one piece of input action information; and performing an interactive operation corresponding to the inter-content operation information, wherein the interactive operation is associated with the at least two pieces of content.

For specific implementations of the steps in the program 432, reference may be made to the corresponding descriptions in the corresponding steps and units in the foregoing embodiments, and further details are not repeated herein again. It may be clearly understood by a person skilled in the art that, for the purpose of convenient and brief description, for detailed working procedures of the foregoing devices and modules, reference may be made to the description of corresponding procedures in the foregoing method embodiments, and further details are not repeated herein again.

Figure 5:
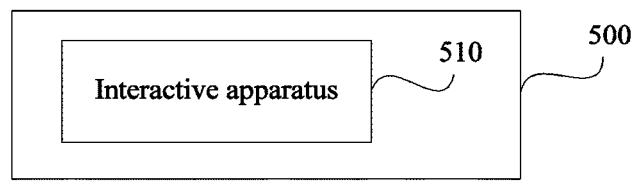
FIG. 5 is a schematic structural block diagram of a user equipment according to an embodiment of the present application.

As shown in FIG. 5, an embodiment of the present application further provides a user equipment 500 comprising the interactive apparatus 510 in the embodiments as shown in FIG. 2 to FIG. 4.

In some possible implementation manners, the user equipment 500 may be, for example, one of the following user equipments:

a smart phone, a tablet computer, a notebook computer, a smart wristband, a pair of smart glasses, a smart helmet and the like.

A person of ordinary skill in the art may be aware that, in combination with the examples described in the embodiments disclosed in this specification, units and method steps may be implemented by electronic hardware or a combination of computer software and electronic hardware. Whether these functions are executed as hardware or software depends upon the particular application and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a non-transitory computer-readable storage medium. Based on such an understanding, the technical solutions of the present application essentially, or the part contributing to the prior art, or some of the technical solutions may be implemented in a form of a software product. The computer software product is stored in a storage medium, and comprises several instructions for instructing a computer device (which may be a personal computer, a server, or a network device) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, an optical disc, or the like.

The above implementations are only used to describe the present application, not to limit the present application; alterations and modifications may be made by those of ordinary skill in the art without departing from the spirit and scope of the present application, so all equivalent technical solutions also belong to the scope of the present application, and the scope of patent protection of the present application should be defined by the claims.

What is claimed is:

1. An interactive method, comprising:
acquiring a piece of user input information, wherein the piece of user input information comprises at least two pieces of biometric feature information and at least one piece of input action information corresponding to the at least two pieces of biometric feature information, wherein the at least one piece of input action information comprises at least one of the following information corresponding to the at least two pieces of biometric feature information: moving track information, movement time information, relative motion information, and relative location information;
determining at least two pieces of content respectively corresponding to the at least two pieces of biometric feature information;
determining inter-content operation information corresponding to the at least one piece of input action information; and
performing an interactive operation corresponding to the inter-content operation information, wherein the interactive operation is associated with the at least two pieces of content.

2. The method of claim 1, wherein each piece of content of the at least two pieces of content comprises at least one of the following:
a user equipment, an application program, and data.

3. The method of claim 1, wherein the inter-content operation information comprises at least one of the following:
operation information of establishing an inter-content association, operation information of disassociating an inter-content association, and operation information of inter-content data transmission.

4. The method of claim 1, wherein each piece of biometric feature information of the at least two pieces of biometric feature information comprises at least one of the following:
a fingerprint, a palmprint, a toe-print, a sole print, iris information, retina information, human face information, and auricle information.

5. The method of claim 1, wherein the determining inter-content operation information corresponding to the at least one piece of input action information comprises:
comparing the at least one piece of input action information with at least one piece of preset input action information; and
determining the inter-content operation information corresponding to the at least one piece of input action information according to a correspondence between the at least one piece of preset input action information and at least one piece of inter-content operation information.

6. The method of claim 1, wherein corresponding to at least one external user equipment comprised in the at least two pieces of content, the performing an interactive operation corresponding to the inter-content operation information comprises:
sending at least one piece of interactive information corresponding to the inter-content operation information to at least one of the at least one user equipment.

7. The method of claim 1, wherein the method further comprises:
associating the at least two pieces of biometric feature information with the at least two pieces of content.

8. A user equipment, wherein the user equipment comprising:
a storage, configured to store a program;
a processor, configured to execute the program which causes the processor to perform a method, comprising:
acquiring a piece of user input information, wherein the piece of user input information comprises at least two pieces of biometric feature information and at least one piece of input action information corresponding to the at least two pieces of biometric feature information, wherein the at least one piece of input action information comprises at least one of the following information corresponding to the at least two pieces of biometric feature information:
moving track information, movement time information, relative motion information, and relative location information;

determining at least two pieces of content respectively corresponding to the at least two pieces of biometric feature information;

determining inter-content operation information corresponding to the at least one piece of input action information; and performing an interactive operation corresponding to the inter-content operation information, wherein the interactive operation is associated with the at least two pieces of content.

9. The user equipment of claim 8, wherein each piece of content of the at least two pieces of content comprises at least one of the following:

a user equipment, an application program, and data.

10. The user equipment of claim 8, wherein the inter-content operation information comprises at least one of the following:

operation information of establishing an inter-content association, operation information of disassociating an inter-content association, and operation information of inter-content data transmission.

11. The user equipment of claim 8, wherein each piece of biometric feature information of the at least two pieces of biometric feature information comprises at least one of the following:

a fingerprint, a palmprint, a toe-print, a sole print, iris information, retina information, human face information, and auricle information.

12. The user equipment of claim 8, wherein the method further comprises:

comparing the at least one piece of input action information with at least one piece of preset input action information; and determining the inter-content operation information corresponding to the at least one piece of input action information according to a correspondence between the at least one piece of preset input action information and at least one piece of inter-content operation information.

13. The user equipment of claim 8, wherein the method further comprises:

corresponding to at least one external user equipment comprised in the at least two pieces of content, send at least one piece of interactive information corresponding to the inter-content operation information to at least one of the at least one user equipment.

14. The user equipment of claim 8, wherein the method further comprises:

associating the at least two pieces of biometric feature information with the at least two pieces of content.

* * * * *